US012286883B1

(12) United States Patent
Dalrymple

(10) Patent No.: US 12,286,883 B1
(45) Date of Patent: Apr. 29, 2025

(54) IMPACT CONTROLLER FOR PRIMARY ROCK BREAKAGE

(71) Applicant: Robert H. Dalrymple, Pine City, NY (US)

(72) Inventor: Robert H. Dalrymple, Pine City, NY (US)

( * ) Notice: Subject to any disclaimer, the term of this patent is extended or adjusted under 35 U.S.C. 154(b) by 0 days.

(21) Appl. No.: 18/989,099

(22) Filed: Dec. 20, 2024

(51) Int. Cl.
*E21C 27/28* (2006.01)
*B25D 17/24* (2006.01)
*E01C 23/12* (2006.01)
*E02F 5/30* (2006.01)

(52) U.S. Cl.
CPC .............. *E21C 27/28* (2013.01); *B25D 17/24* (2013.01); *E01C 23/124* (2013.01); *E02F 5/305* (2013.01)

(58) Field of Classification Search
CPC ....... B25D 17/24; E21C 27/28; E01C 23/124; E02F 5/305
See application file for complete search history.

(56) References Cited

U.S. PATENT DOCUMENTS 468,486 A * 2/1892 Fobes ................... E01C 23/124 173/87
2,121,480 A * 6/1938 Finn ...................... E01C 23/124 173/87
5,490,740 A * 2/1996 Johnson ................ E01C 23/124 404/133.05
7,237,706 B2 * 7/2007 Vought .................. E01C 23/124 227/62
8,061,439 B2 * 11/2011 Nelson ..................... B28D 1/26 173/128
2010/0126746 A1 * 5/2010 Robson .................. B25D 17/08 173/210
2012/0247798 A1 * 10/2012 Robson ................... E02F 3/966 173/211
2015/0202763 A1 * 7/2015 Robson ................. B32B 15/095 384/42
2016/0108987 A1 * 4/2016 Williamson ............ F16F 15/08 15/98

* cited by examiner

*Primary Examiner* — Janine M Kreck
(74) *Attorney, Agent, or Firm* — David L. Nocilly; Bond Schoeneck & King PLLC

(57) ABSTRACT

A mining apparatus for primary breakage having a drop hammer with a drop weight that may fall from a first position where the drop weight is suspended within an upper end of the drop hammer and a second position where the drop weight extends from a lower end of the drop hammer. The mining apparatus has a shock absorber assembly coupled to the lower end of the drop hammer with a first passageway through which the drop weight may pass. The mining apparatus also has a rebound cage coupled to the shock absorber assembly and having a series of guides positioned therein and arranged about a second passageway that is in alignment with the first passageway. The rebound cage controls the drop weight when it falls into the second position, strikes the ground, and rebounds.

18 Claims, 10 Drawing Sheets

IMPACT CONTROLLER FOR PRIMARY ROCK BREAKAGE

BACKGROUND OF THE INVENTION

1. Field of the Invention

The present disclosure relates to mining hammers and, more particularly, to a mining hammer attachment that can be used for primary breakage such as in a rock ore quarry.

2. Description of the Related Art

Standard practice for mining rock ore begins with blasting to accomplish primary breakage where bedrock formations are broken up to provide rock ore in more useful sizes. When mines are located near populated areas, there can be significant public opposition to expanding existing mines or permitting new mines because of the blasting that is likely to take place. For example, frequently cited complaints include the noise, dust, and vibrations that result from the use of explosives.

Mining operations may include the use of drop hammers and eccentric rippers. These rippers cannot break rock, and can only dislodge rock that has previously been broken by natural forces into multiple fracture planes. Drop hammers are only used for secondary breakage where any boulders, formed from the explosions, that are too large to enter a primary crusher are further broken down into more useful sizes. These hammers are not well-suited for the repetitive duty-cycle demands of primary breakage on the quarry floor and will experience significant metal fatigue. Accordingly, there is a need for a device that can be used to mine rock ore from bedrock and thereby avoid the need to use explosives for primary breakage.

BRIEF SUMMARY OF THE INVENTION

The present invention provides a mining hammer that can be used to mine rock ore from bedrock and thus avoid the need for explosives. In an example, the mining apparatus may include a drop hammer having a drop weight therein that is moveable between a first position where the drop weight is suspended within an upper end of the drop hammer and a second position where the drop weight extends from a lower end of the drop hammer. The mining apparatus may also include a shock absorber assembly coupled to the lower end of the drop hammer and having a first passageway through which the drop weight may pass when the drop weight moves between the first position and the second position. The mining apparatus may further include a rebound cage coupled to the shock absorber assembly and having a series of guides positioned therein and arranged about a second passageway that is in alignment with the first passageway to contain the drop weight when it moves into the second position. The drop weight may have a cylindrical body and a frustroconical tip extending from a lower portion of the cylindrical body. The shock absorber may comprise an upper plate coupled to the lower end of the drop hammer and a lower plate spaced apart from the upper plate by a series of shocks extending circumferentially about the first passageway. The rebound cage may comprise a frame and an upper bracket, wherein the upper bracket is coupled to a lower plate of the shock absorber. The frame may support a series of guides positioned about the second passageway. The series of guides may include one of a series of wear plates attached thereto. The series of guides may be positioned about the second passageway so that the series of wear plates extend tangentially to a cylindrical outer surface of the drop weight. The wear plates define a cylindrical passageway having an inner diameter that is larger than an outer diameter of the drop weight. The inner diameter of the cylindrical passageway may be ⅜ of an inch larger than the outer diameter of the drop weight.

In another embodiment, the present invention involves a method of mining rock. In a first step, the method involves providing a mining apparatus including a drop hammer having a drop weight therein that is moveable between a first position where the drop weight is suspended within an upper end of the drop hammer and a second position where the drop weight extends from a lower end of the drop hammer, a shock absorber assembly coupled to the lower end of the drop hammer and having a first passageway through which the drop weight may pass when the drop weight moves between the first position and the second position, and a rebound cage coupled to the shock absorber assembly and having a series of guides positioned therein and arranged about a second passageway that is in alignment with the first passageway to contain the drop weight when it moves into the second position. The method also includes the step of dropping the drop weight from the first position to the second position through the first passageway and the second passageway so that an end of the drop weight strikes a surface positioned under the rebound case. The method may further include the step of lifting the drop weight from the second position to the first position with the drop hammer and the step of repeating the step of dropping the drop weight from the first position to the second position through the first passageway and the second passageway.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
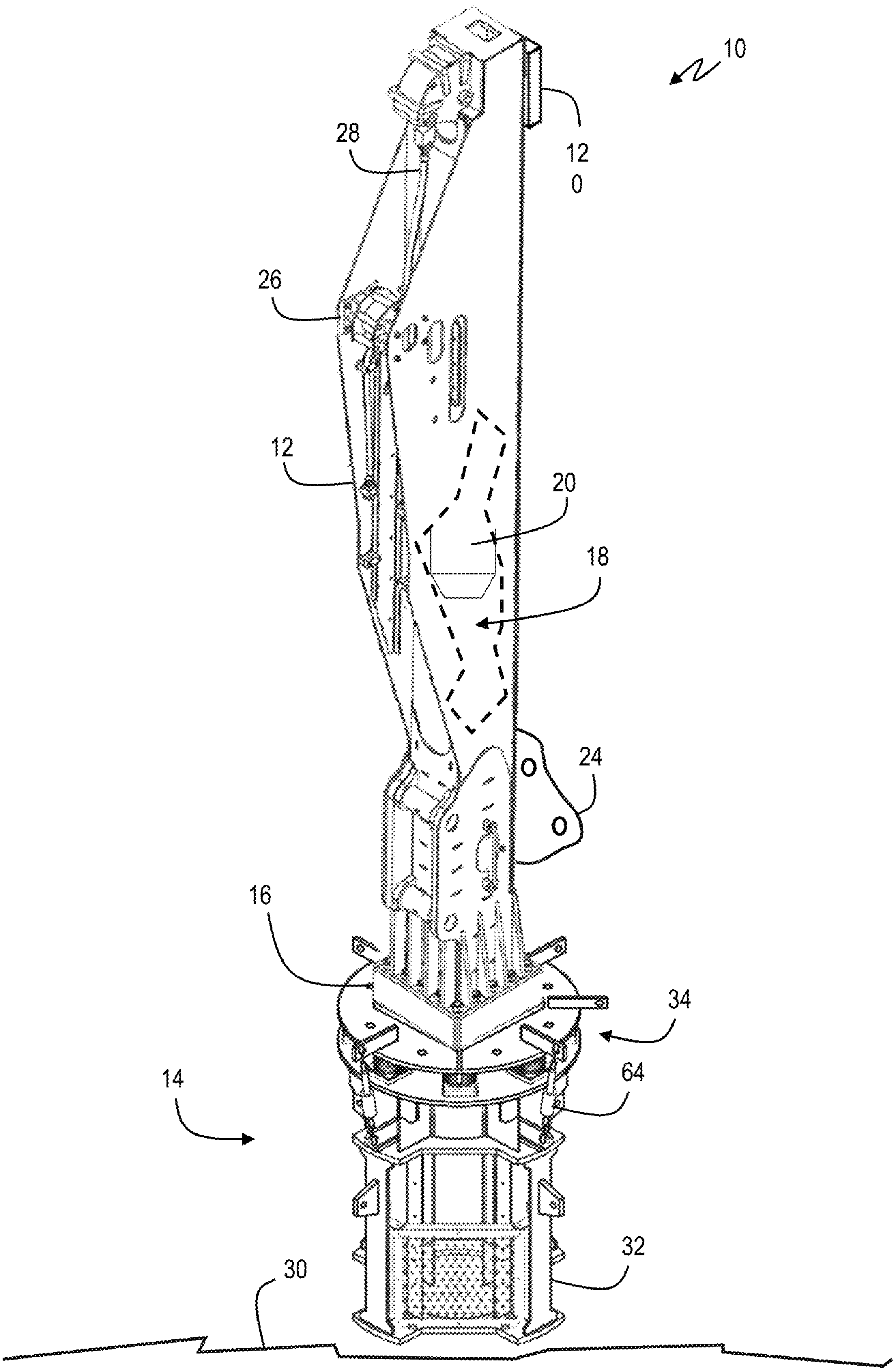
FIG. 1 is a perspective view of a mining hammer having a mining assembly according to the present invention.
Figure 2:
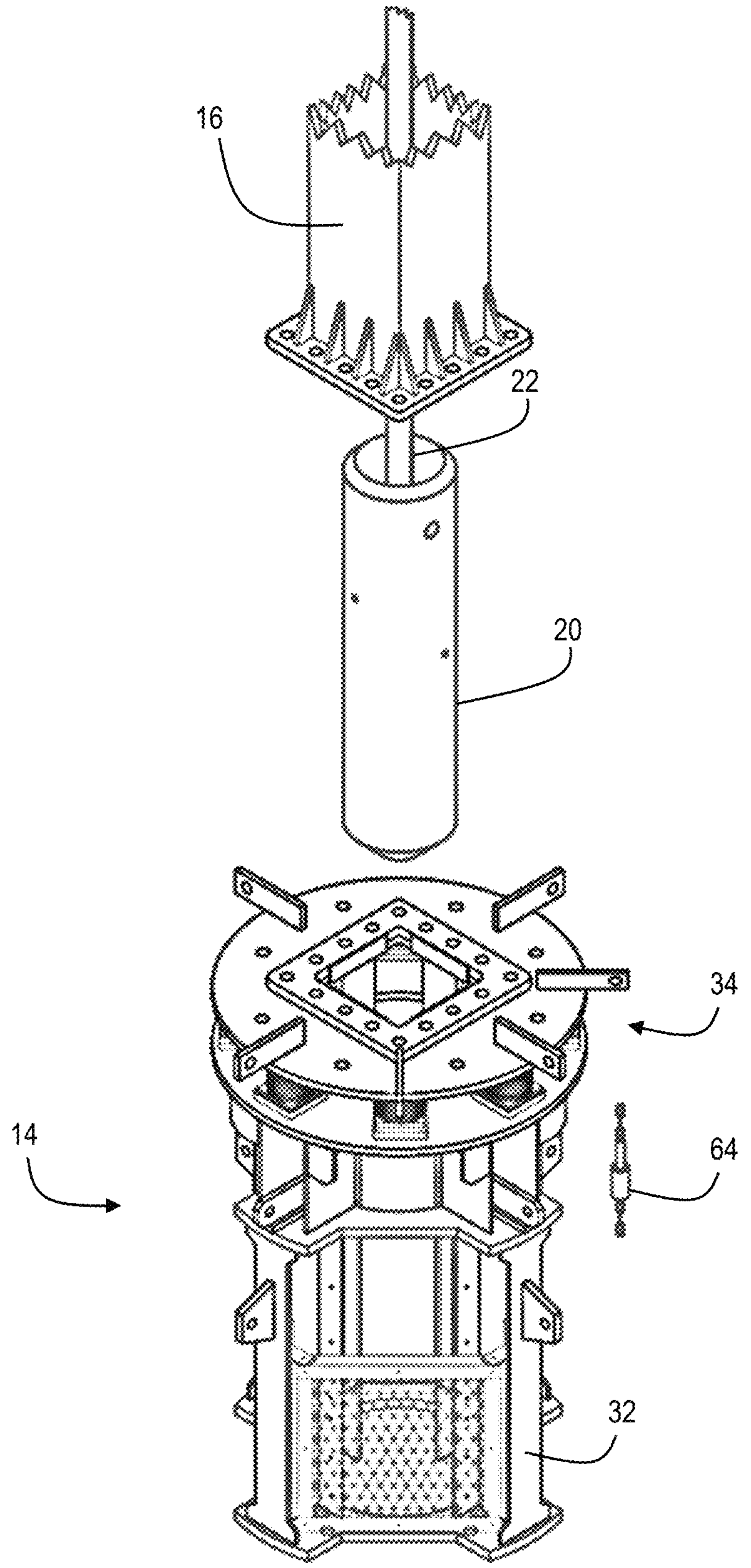
FIG. 2 is a perspective view of a mining assembly according to the present invention.

Referring to the figures, wherein like numerals refer to like parts throughout, there is seen in FIG. 1 and FIG. 2, a mining hammer 10 according to the present invention comprises a drop hammer 12 and a mining assembly 14 coupled to the lower end 16 of drop hammer 12. As with conventional devices, drop hammer 12 comprises a chamber 18 having a drop weight 20 suspended and moveable therein by a strap 22. Drop hammer 12 includes a bracket 24 for coupling to an excavator (not shown) so that drop hammer 12 can be positioned vertically (or substantially vertically) by excavator in a location where rock is to be broken and to operate the hydraulics of drop hammer 12. Strap 22 of drop hammer 12 is used to lift drop weight 20 vertically through chamber 18 via a pulley system 26 and a hydraulic actuating system 28. Pulley system 26 is desired to raise and then release drop weight 20 so that drop weight 20 falls freely under the force of gravity through chamber 18 and into mining assembly 14 where it then contacts target surface 30, such as the surface of an area of bedrock to be mined or a rock that needs to be broken into smaller pieces.

As further seen in FIGS. 1 and 2, mining assembly 14 comprises a rebound cage 32 interconnected to the end of drop hammer 12 by a shock absorber assembly 34. Rebound cage 32 is aligned with lower end 16 of drop hammer 12 to receive and guide drop weight 20 therein when it is released by pulley system 26. Strap 22 is dimensioned to allow drop weight 20 to pass out of lower end 16 of drop hammer 12, pass through shock absorber assembly 34 and into rebound cage 32.

Figure 3:
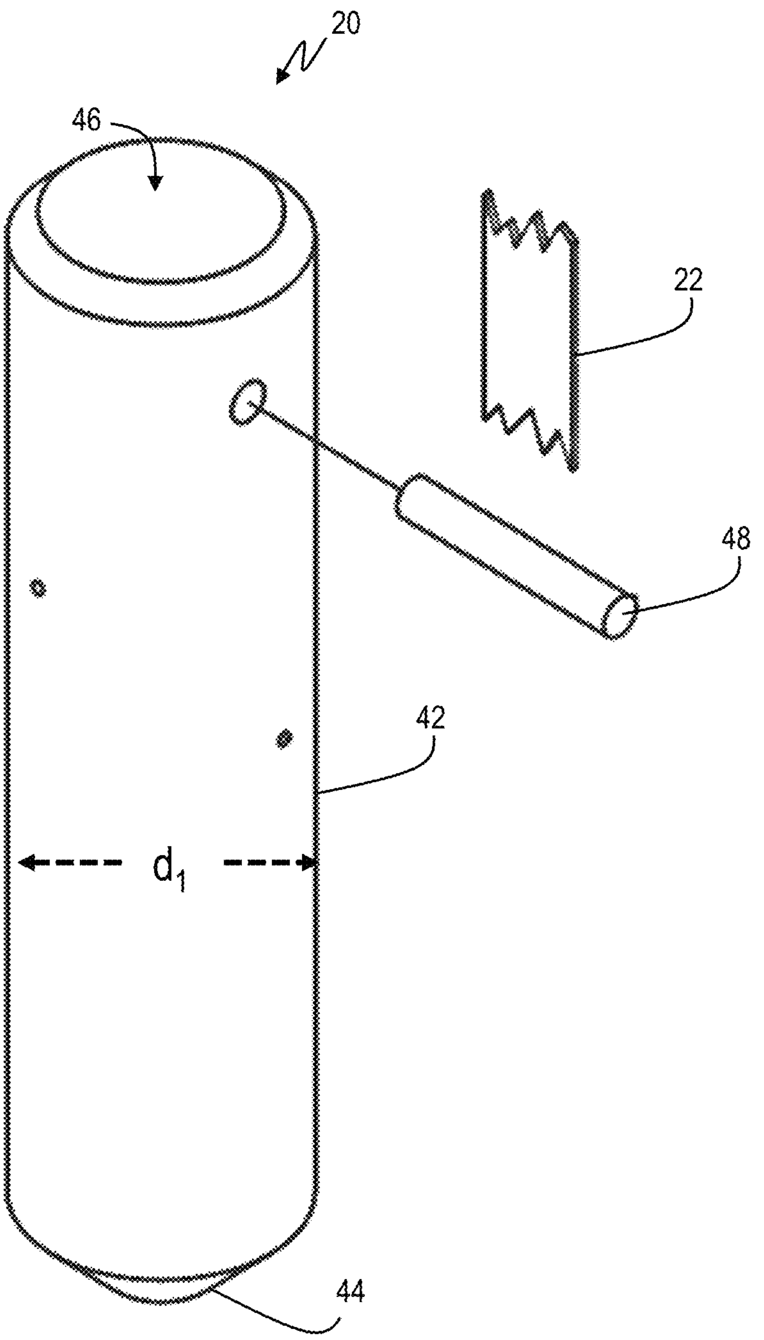
FIG. 3 is a perspective view of a drop weight according to the present invention.

Referring to FIG. 3, drop weight 20 comprises a cylindrical body 42 having a frustroconical tip 44 and thus differs from standard rectangular drop weights. Drop weight 20 may have a weight over 6,000 pounds, such as 6,800 pounds, a length of 84 inches exceeding that of conventional drop weights, and an outer diameter $d_1$ of 20 inches. Drop weight 20 is preferably 4340 steel which is forged, annealed, quenched and tempered to a Rockwell hardness of 43 to 47 RC. As with conventional drop weights, cylindrical body 42 may include features formed into the rear end 46 for coupling to strap 22 of drop hammer via a pin 48. Cylindrical body 42 of drop weight 20 has an outer diameter $d_1$ that is used to configure the sizing of shock absorber assembly 34 and into rebound cage 32, as explained below.

Figure 4:
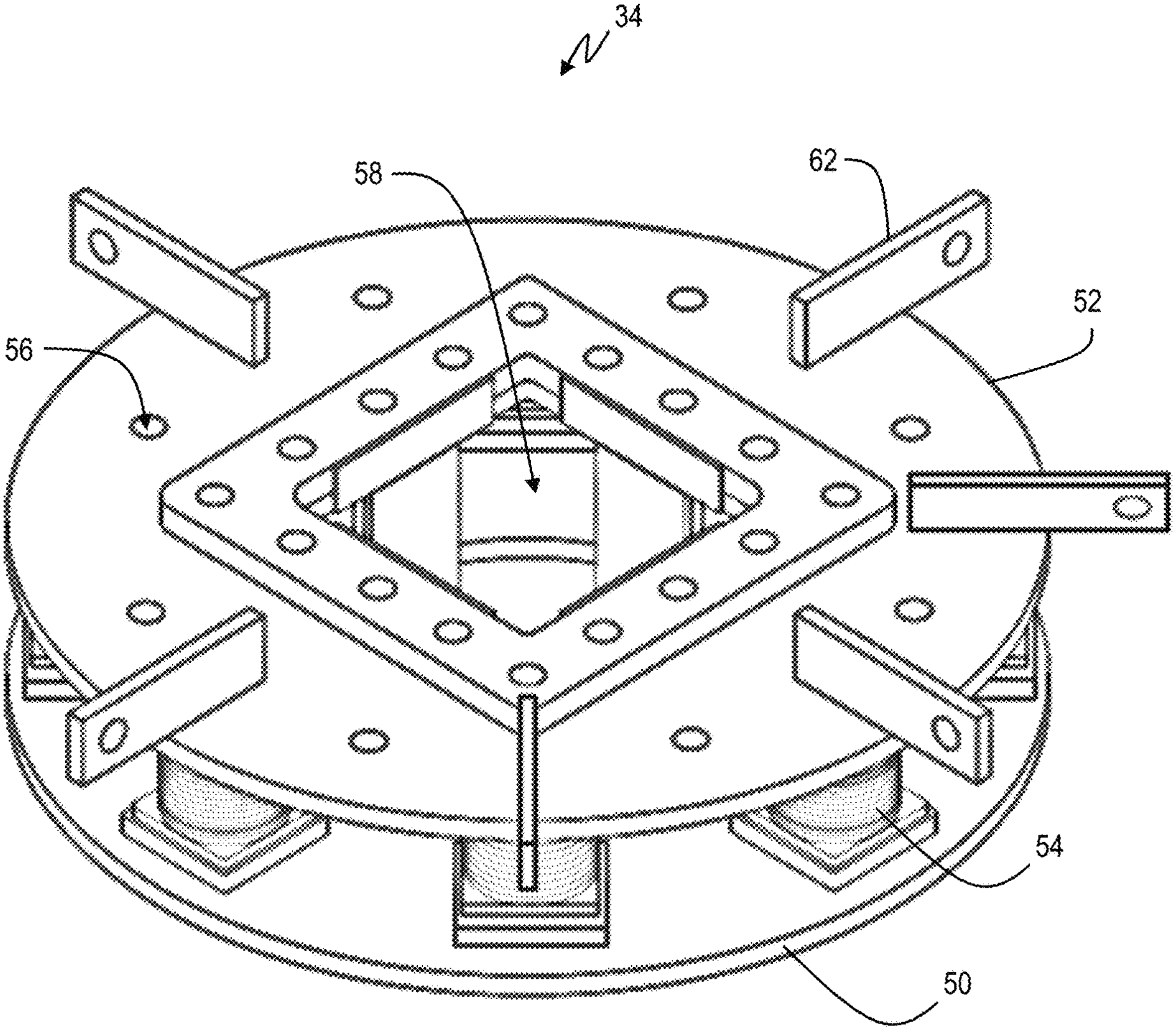
FIG. 4 is a perspective view of a shock absorber assembly according to the present invention.
Figure 5:
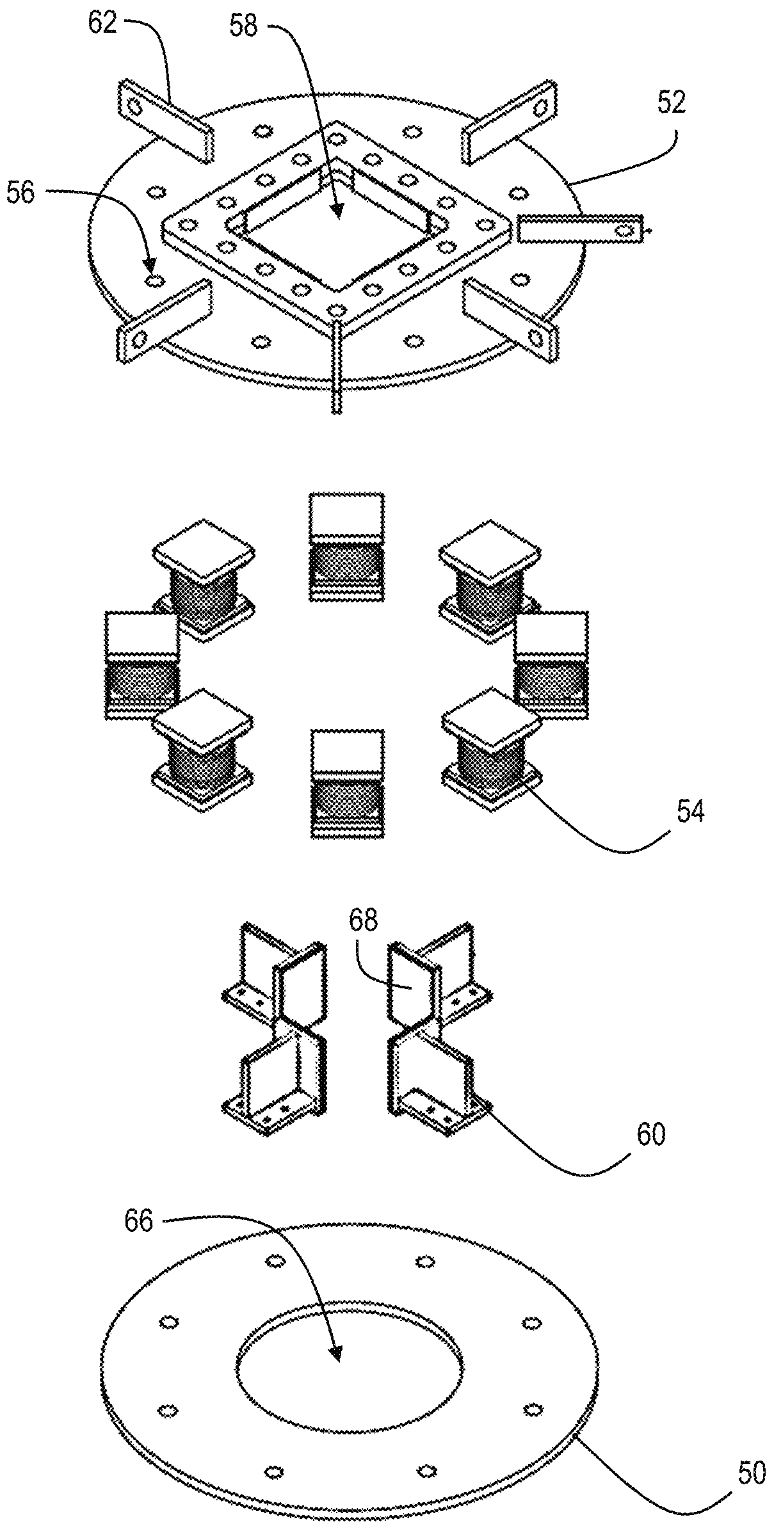
FIG. 5 is an exploded view of a shock absorber assembly according to the present invention.

Referring to FIG. 4, shock absorber assembly 34 is comprised of a lower plate 50 and an upper plate 52 are spaced apart from each other by a series of shocks 54 that are coupled to and extend between lower plate 50 and upper plate 52. Shocks 54 may comprise conventional suspension mounts such as those offered by Caterpillar Inc. of Peoria, IL. Upper plate 52 of shock absorber assembly 34 is circular and includes a rectangular central passage 58 that is wide enough to accommodate drop weight 20 so that drop weight 20 may pass through shock absorber assembly 34 to reach rebound cage 32 after exiting lower end 16 of drop hammer 12. Upper plate 52 further includes mounting holes 56 for bolting directly to lower end 16 of drop hammer 12. As seen in FIG. 5, shock absorber assembly 34 further includes guides 60 positioned about central passage 58 to ensure drop weight 20 passes through shock absorber assembly 34. Guides 60 may include wear plates 68 that are replaceable. Shock absorber assembly 34 further includes a series of coupling arms 62 extending outwardly therefrom for connecting to rebound cage 32 via lifting ratchets 64, as seen in FIG. 2. Lifting ratchets 64 allow for repositioning of mining assembly 14 by securing upper plate 52 of shock absorber assembly 34 to rebound cage 32 as shocks 54 are designed for compression rather than tension and thus cannot readily support the weight of rebound cage 32 when moving to a new location. Lower plate 50 of shock absorber assembly 34 is also circular and includes circular passage 66 so that drop weight 20 may pass entirely through shock absorber assembly 34 to reach rebound cage 32.

Figure 6:
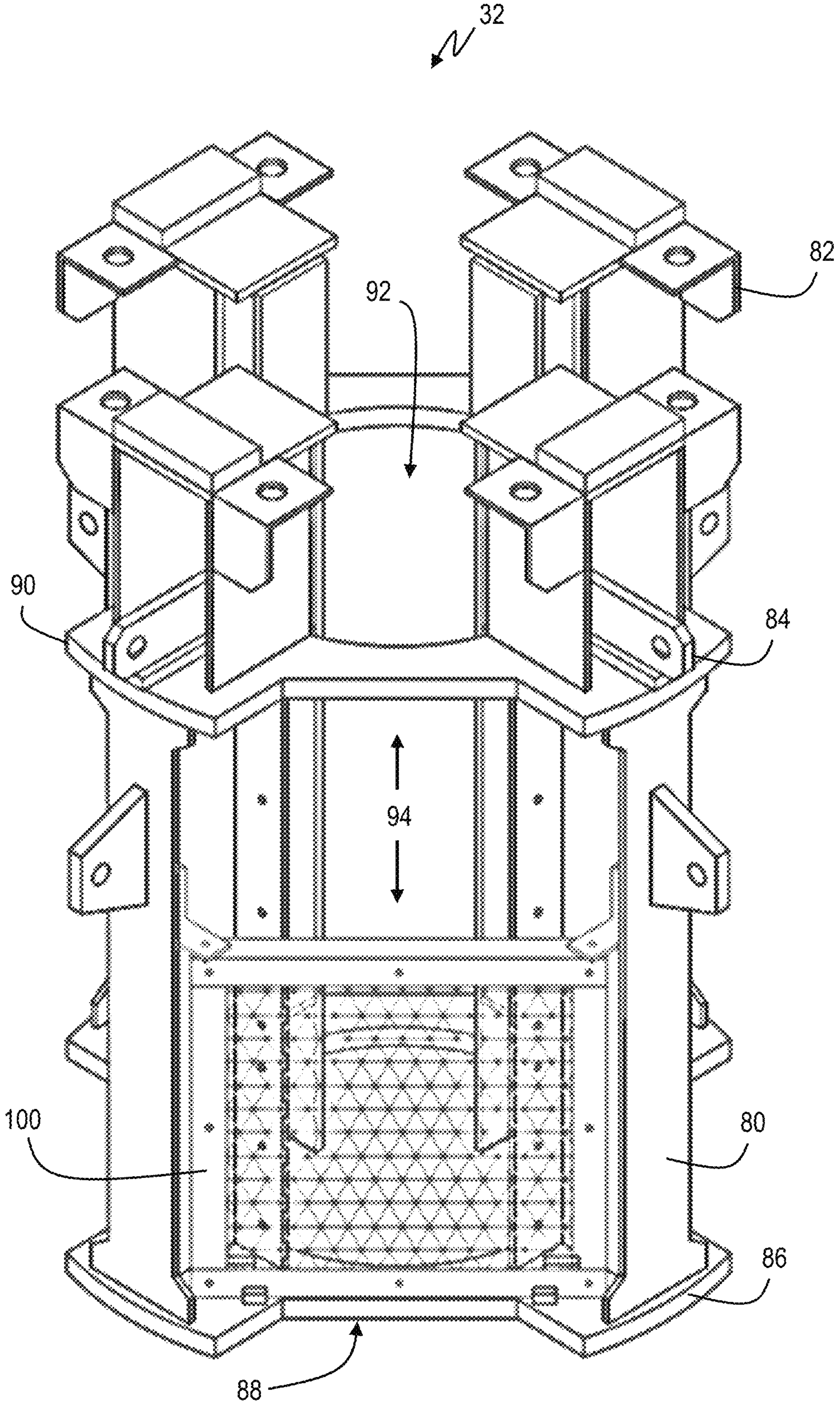
FIG. 6 is a perspective view of a rebound cage according to the present invention.
Figure 7:
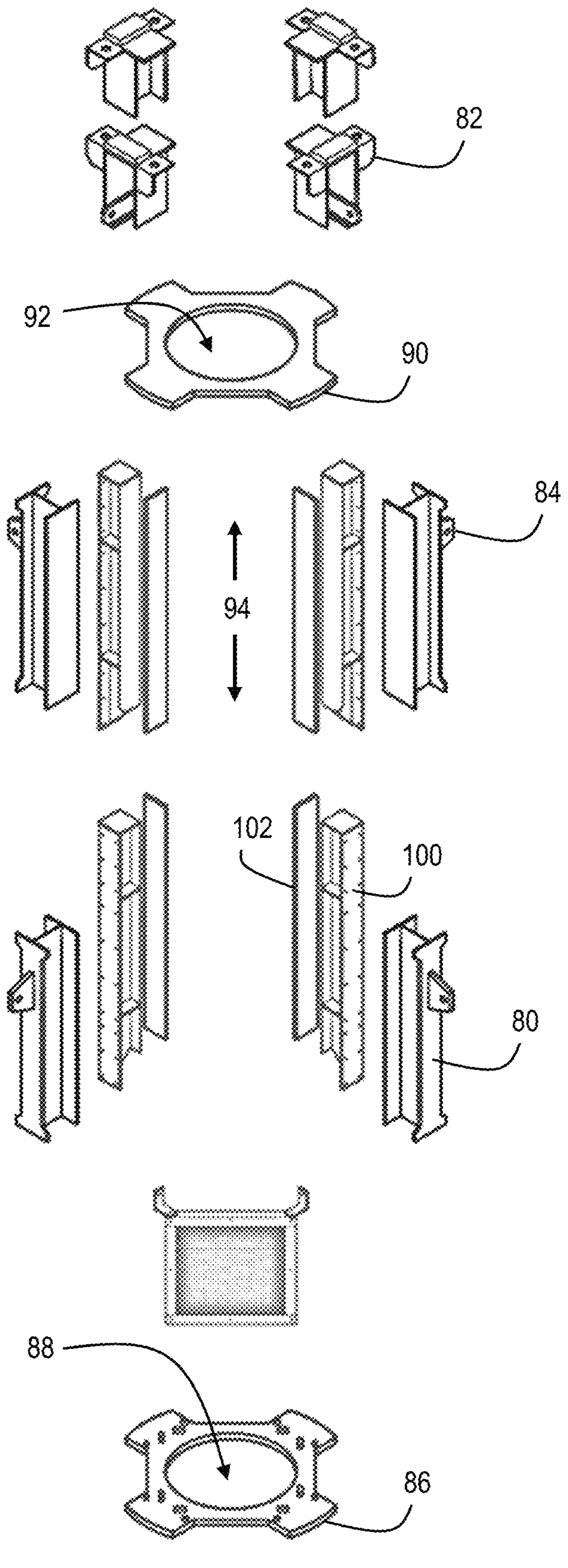
FIG. 7 is an exploded view of a rebound cage according to the present invention.

Referring to FIG. 6, rebound cage 32 comprises a series of outer frame columns 80 coupled to a lower plate 86 having a lower opening 88 and an upper plate 90 having an upper opening 92 to define a mining passage 94 through which drop weight 20 may fall so that tip 44 can strike surface 30 positioned proximately to lower opening 88. Rebound cage 32 includes upper brackets 82 for connecting to lower plate 50 of shock absorber assembly 34 and posts 84 for interconnecting to coupling arms 62 of shock absorber assembly 34 via lifting ratchets 64. As seen in FIG. 7, outer frame columns 80 support a series of wear columns 100 that are spaced equidistantly about a mining passage 94. Wear columns 100 preferably include removable wear plates 102 that are attached to the inside facing surfaces of wear columns 100 to provide a smooth surface, such as through the use of countersunk bolts. Wear plates 102 and wear columns 100 are oriented tangentially to mining passage 94 and thus provide guides that are positioned tangentially to the outer surface of drop weight 20 when it passes through mining passage 94. Wear plates 102 thus act as a guide to keep drop weight 20 aligned as it passes through central passage, impacts surface 30 positioned proximately to rebound cage 32, and rebounds from surface 30. As a result, any wear that occurs during repeated dropping and rebounding of drop weight 20 can be remedied by replacing wear plates 102 rather than having to replace wear columns 100.

Figure 8:
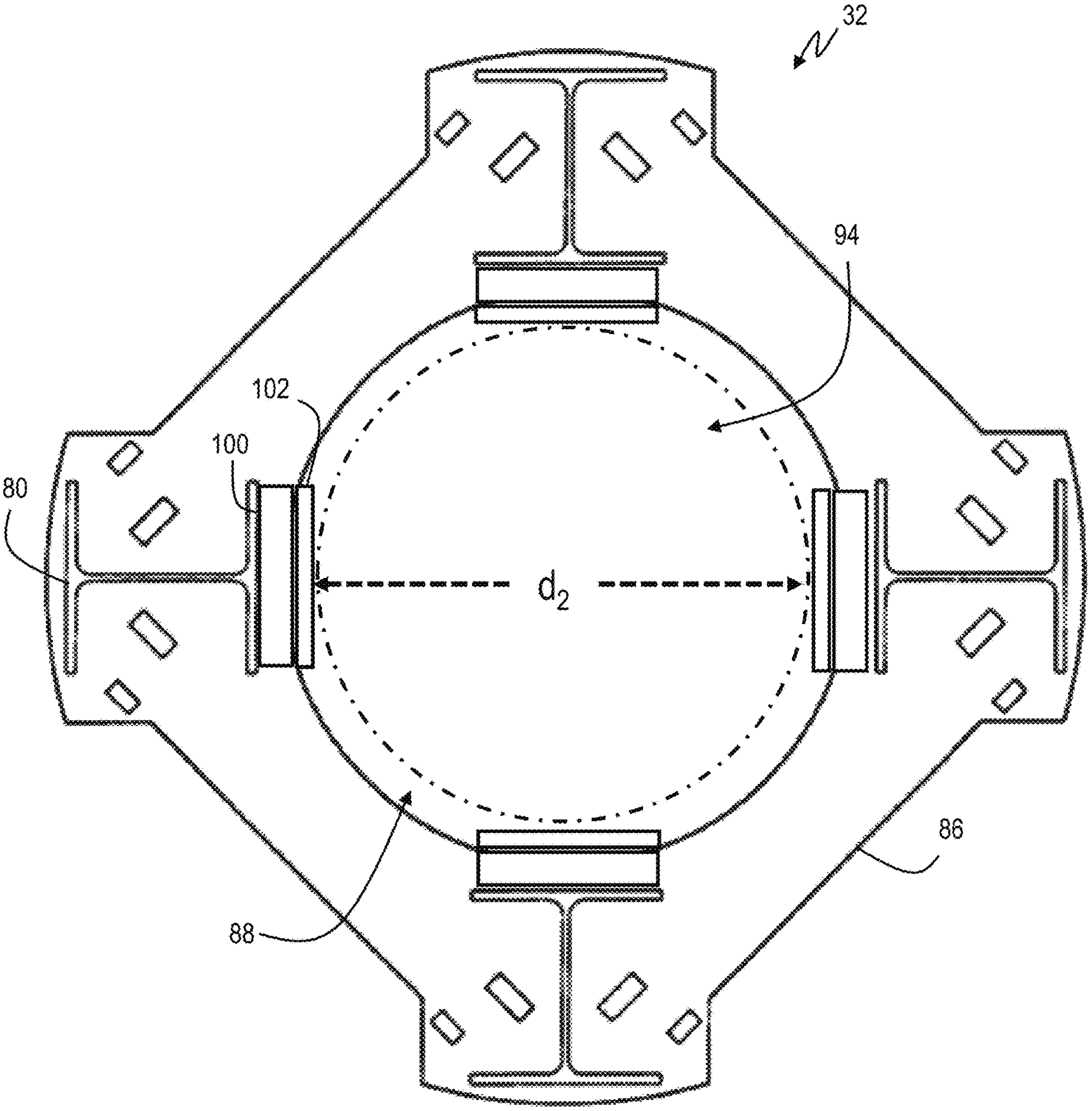
FIG. 8 is a top view of a portion of a rebound cage showing wear plates according to the present invention.
Figure 9:
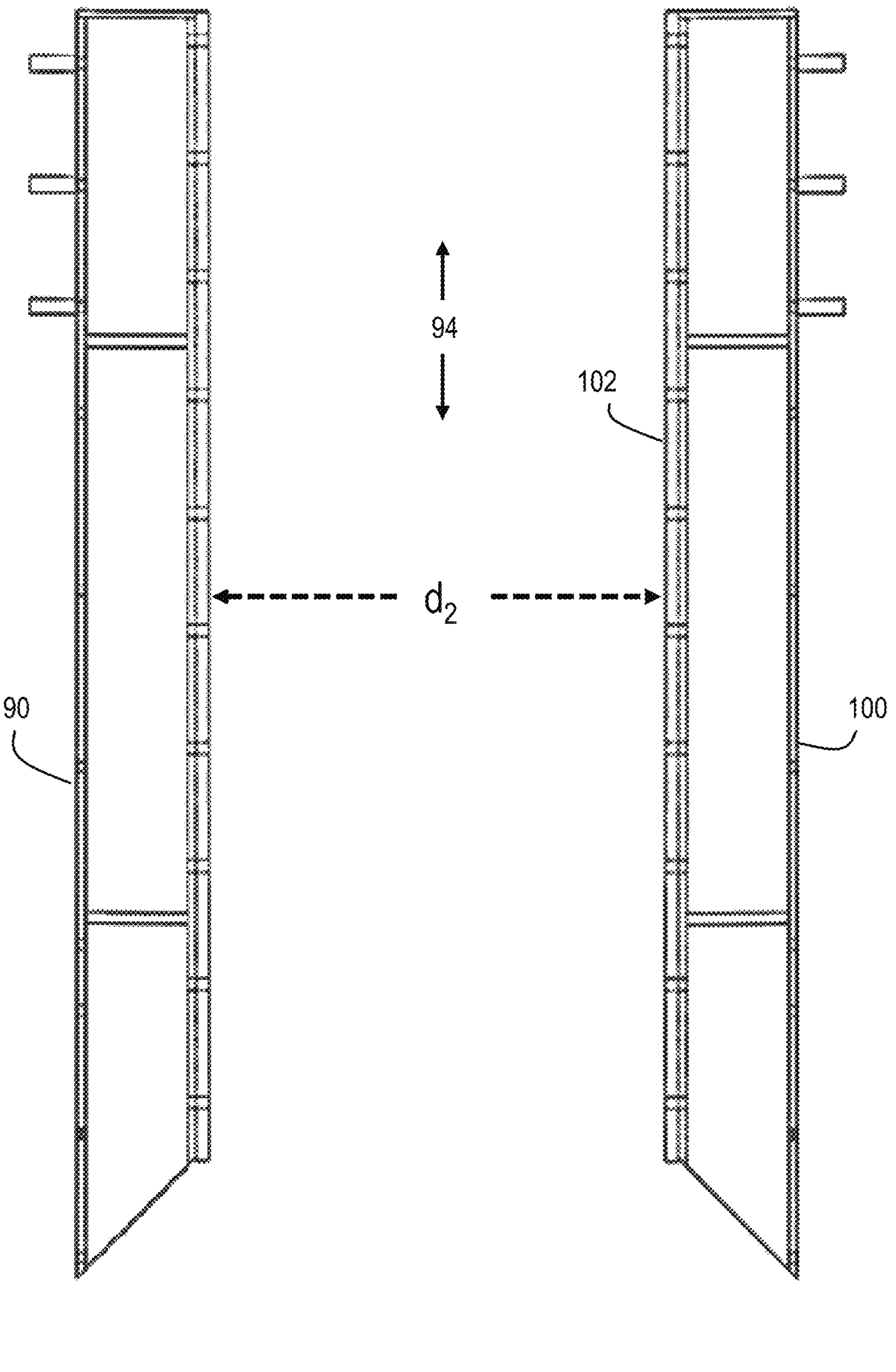
FIG. 9 is a side view of a portion of rebound cage showing spacing of the wear plates according to the present invention.

Referring to FIG. 8, wear plates 102 are spaced apart and positioned tangentially to mining passage 94 to provide a pathway with a diameter $d_2$ that is slightly larger than diameter $d_1$ of drop weight 20. As series of wear plates 102 are positioned tangentially to mining passage 94, series of wear plates 102 essentially define a cylindrical pathway that is just large enough to accommodate drop weight 20 and thus will constrain movement of drop weight 20 prior to or after contacting a surface. As an example, series of wear plates 102 may define a cylindrical opening having diameter $d_2$ of 20¾ inches when diameter $d_1$ is 20 inches, thereby providing for a ⅜ inch gap between each wear plate 102 and the outer surface of drop weight 20. Wear plates 102 ensure that drop weight 20 remains vertical when it contacts surface 30 and maintains drop weight 20 in a primarily vertical orientation after striking surface 30. Due to the weight of drop weight 20 and the likely irregular nature of surface 30, wear plates 102 will be subject to significant forces and thus are intended to be easily replaced over time. Forces transmitted from drop weight 20 to wear plates 102 are attenuated by shock absorber assembly 34 to prevent unnecessary stresses and fatigue on drop hammer 12 as well as the equipment used to position drop hammer 12 in place, such as an excavator, and the user.

Figure 10:
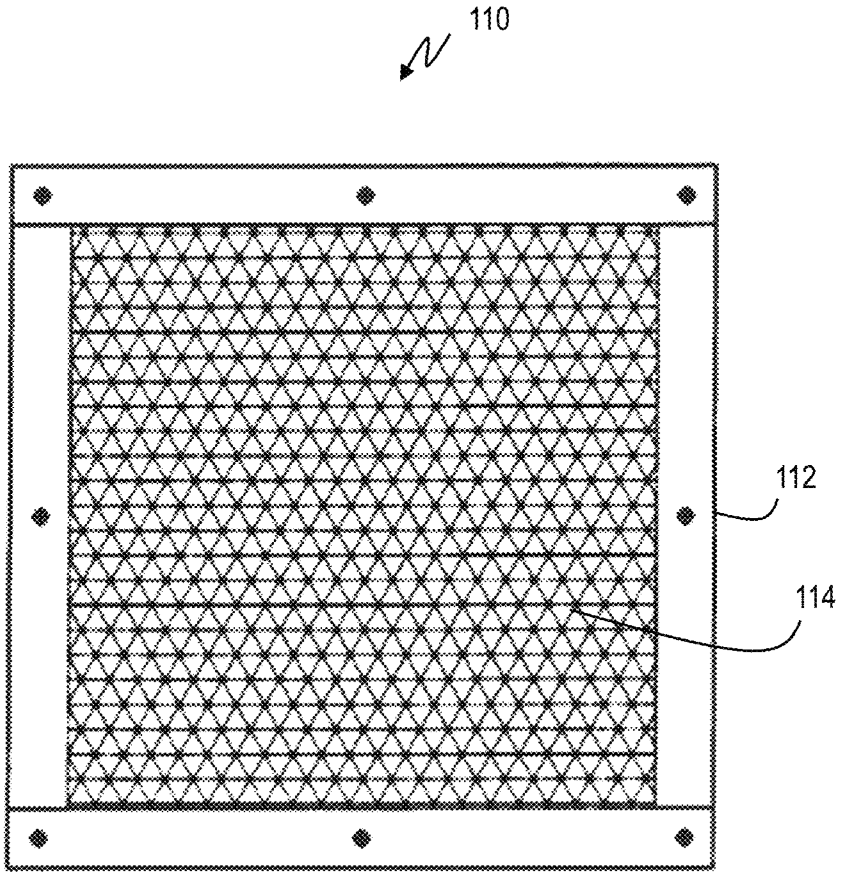
FIG. 10 is a front view of a protective screen for a rebound cage according to the present invention.

As seen in FIG. 10, fly rock screen 110 may be attached to all sides of rebound cage 32 to prevent any detritus from exiting rebound cage 32 during use and presenting a hazard to the user. Screens 110 may include a frame 112 that can be attached to rebound cage 32 and that encloses a mesh screen 114 that extends within frame 112 and will close off each open side of rebound cage 32.

Optionally, as seen in FIG. 1, mining hammer 10 may include a sensor package 120 mounted on drop hammer 12. Sensor package 120 preferably includes sensors that can provide information about the alignment of drop hammer 12. For example, mining hammer 10 is more effective if oriented within 2 degrees of vertical, i.e., between 88 and 92 degrees. It may be difficult to perceive whether drop hammer 12 is pitched forward or backward from vertical from within the cab of an excavator to which mining hammer 10 is attached. Sensor package 120 may include a visual display that can be positioned proximately to a user that can display the current orientation of drop hammer 12 so that a user can ensure drop hammer 12 is vertical in the forward/backward direction.

The present invention thus provides a viable alternative to blasting rock that overcomes serious limitations with existing technology regarding mechanical breakage of rock. The cylindrical drop weight, rebound cage and shock absorber assemblies, together with the remote plumb sensing device have resulted in several improvements. For example, use of the present invention eliminates blasting noise and vibration, which is especially meaningful in densely populated areas. The present invention also eliminates fly-rock from blasting that can cause safety problems as well as air pollution stemming from blasting dust and fumes. The present invention further eliminates the serious metal fatigue that cyclical impact stresses have on the hammer and the excavator, thereby avoiding expensive welding repairs and associated down-time. Working embodiments of the present invention have confirmed that mining hammer 10 can be used for primary breakage in a quarry and have been used to break 539,324 tons of rick. Mining hammer 10 can be used at duty cycle that will achieve rates of production that can keep up with a primary crusher without impact damage to mining hammer 10. While the present invention is intended primarily for primary breakage, it should be recognized that the present invention would also be well suited for other purposes, such as demolition of hard surfaces like road beds, or the fracturing of utility trenches in rocky locations which are close to populations.

What is claimed is:

1. A mining apparatus, comprising:

a drop hammer having a drop weight therein that is moveable between a first position where the drop weight is suspended within an upper end of the drop hammer and a second position where the drop weight extends from a lower end of the drop hammer;

a shock absorber assembly coupled to the lower end of the drop hammer and having a first passageway through which the drop weight may pass when the drop weight moves between the first position and the second position, wherein the shock absorber assembly comprises an upper plate coupled to the lower end of the drop hammer and a lower plate spaced apart from the upper plate by a series of shocks extending circumferentially about the first passageway; and a rebound cage coupled to the shock absorber assembly and having a series of guides positioned therein and arranged about a second passageway that is in alignment with the first passageway to contain the drop weight when it moves into the second position.

2. The mining apparatus of claim 1, wherein the drop weight has a cylindrical body and a frustroconical tip extending from a lower portion of the cylindrical body.

3. The mining apparatus of claim 2, wherein the drop weight has a weight of at least six thousand pounds.

4. The mining apparatus of claim 1, wherein the shock absorber assembly comprises an upper plate coupled to the lower end of the drop hammer and a lower plate spaced apart from the upper plate by a series of shocks extending circumferentially about the first passageway.

5. The mining apparatus of claim 1, wherein the shock absorber assembly includes a series of guides positioned about the first passageway.

6. The mining apparatus of claim 5, wherein each of the series of guides includes one of a series of wear plates attached thereon.

7. The mining apparatus of claim 6, wherein the drop hammer is bolted to the upper plate of the shock absorber assembly and the rebound cage is bolted to the lower plate of the shock absorber assembly.

8. A mining apparatus, comprising:

a drop hammer having a drop weight therein that is moveable between a first position where the drop weight is suspended within an upper end of the drop hammer and a second position where the drop weight extends from a lower end of the drop hammer;

a shock absorber assembly coupled to the lower end of the drop hammer and having a first passageway through which the drop weight may pass when the drop weight moves between the first position and the second position; and a rebound cage coupled to the shock absorber assembly and having a series of guides positioned therein and arranged about a second passageway that is in alignment with the first passageway to contain the drop weight when it moves into the second position, wherein the rebound cage comprises a series of frame columns extending around the second passageway and coupled to an upper bracket by an upper plate.

9. The mining apparatus of claim 8, wherein the upper bracket is coupled to a lower plate of the shock absorber assembly.

10. The mining apparatus of claim 9, wherein each of the series of frame columns supports one of a series of guides.

11. The mining apparatus of claim 10, wherein each of the series of guides includes one of a series of wear plates attached thereto.

12. The mining apparatus of claim 11, wherein the series of guides are positioned about the second passageway so that the series of wear plates extend tangentially to a cylindrical outer surface of the drop weight when the drop weight is in the second passageway.

13. The mining apparatus of claim 12, wherein wear plates define a cylindrical passageway having an inner diameter that is larger than an outer diameter of the drop weight.

14. The mining apparatus of claim 13, wherein the inner diameter of the cylindrical passageway is at least ⅜ of an inch larger than the outer diameter of the drop weight.

15. The mining apparatus of claim 11, further comprising at least one fly rock screen coupled to a side of the rebound cage.

16. A method of mining rock, comprising the steps of:

providing a mining apparatus including a drop hammer having a drop weight therein that is moveable between a first position where the drop weight is suspended within an upper end of the drop hammer and a second position where the drop weight extends from a lower end of the drop hammer, a shock absorber assembly coupled to the lower end of the drop hammer and having a first passageway through which the drop weight may pass when the drop weight moves between the first position and the second position, wherein the shock absorber assembly comprises an upper plate coupled to the lower end of the drop hammer and a lower plate spaced apart from the upper plate by a series of shocks extending circumferentially about the first passageway, and a rebound cage coupled to the shock absorber assembly and having a series of guides positioned therein and arranged about a second passageway that is in alignment with the first passageway to contain the drop weight when it moves into the second position; and dropping the drop weight from the first position to the second position through the first passageway and the second passageway so that an end of the drop weight strikes a surface positioned under the rebound cage.

17. The method of claim 16, further comprising the step of lifting the drop weight from the second position to the first position with the drop hammer.

18. The method of claim 17, further comprising the step of repeating the step of dropping the drop weight from the first position to the second position through the first passageway and the second passageway.

* * * * *